United States Patent [19]

Rivard

[11] Patent Number: 5,542,642

[45] Date of Patent: Aug. 6, 1996

[54] TURBINE SUPPORT STRUCTURE

[75] Inventor: Robert L. Rivard, West Boylston, Mass.

[73] Assignee: Tuthill Corporation, Millbury, Mass.

[21] Appl. No.: 393,728

[22] Filed: Feb. 24, 1995

[51] Int. Cl.⁶ .................................................. F16M 13/00
[52] U.S. Cl. ............................................ 248/676; 248/678
[58] Field of Search .................................. 248/676, 678, 248/673, 672, 659, 661, 346.01, 146, 176.1

[56] References Cited

U.S. PATENT DOCUMENTS

| | | | |
|---|---|---|---|
| 2,957,665 | 10/1960 | Feiertag et al. | 248/672 X |
| 4,191,356 | 3/1980 | Ashmun et al. | 248/678 |
| 4,505,449 | 3/1985 | Turner et al. | 248/678 X |

*Primary Examiner*—Ramon O. Ramirez
*Attorney, Agent, or Firm*—Samuels, Gauthier, Stevens & Reppert

[57] ABSTRACT

A support structure is disclosed for a steam turbine having an output shaft driven for rotation about a horizontal axis. The support structure includes a horizontal open-centered rectangular base frame. Posts extend upwardly in cantilever fashion from the corners of the base frame. The turbine casing is vertically supported exclusively on the upper ends of the posts, and associated constraints resist translational and pivotal movement of the casing in relation to the base frame. The posts are axially stiff, yet are bendable to accommodate thermal expansion and contraction of the turbine casing.

12 Claims, 3 Drawing Sheets

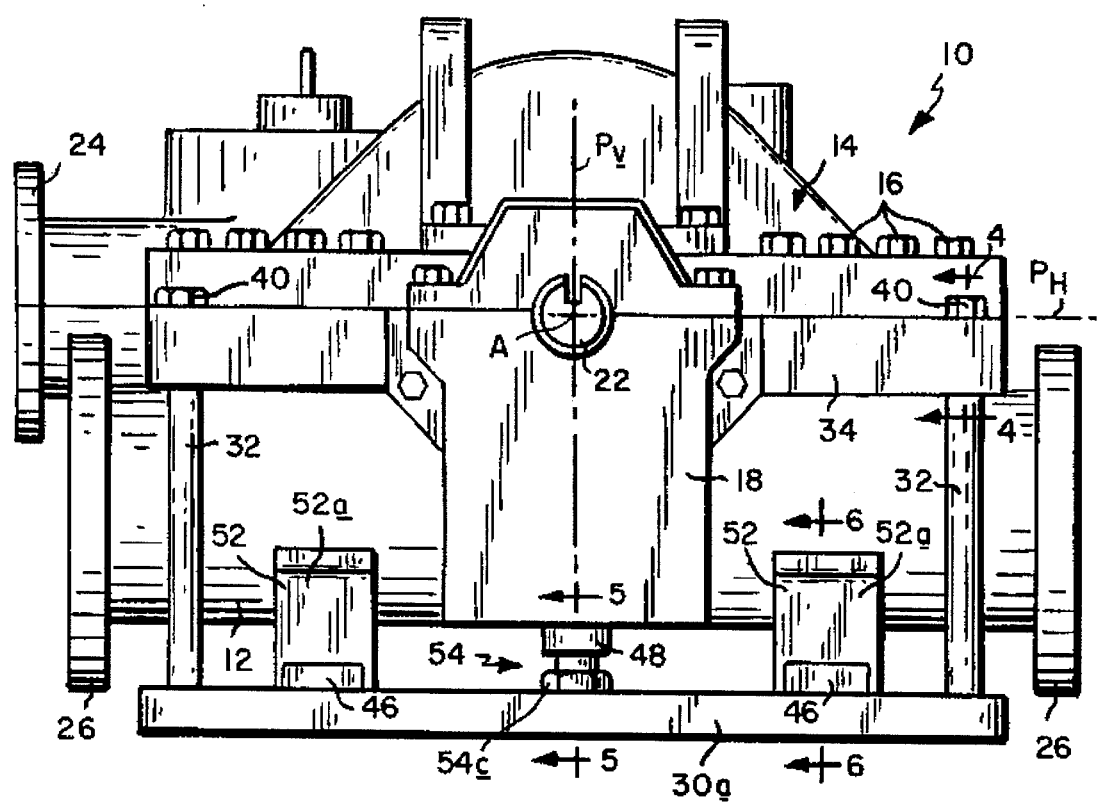
FIG. 3
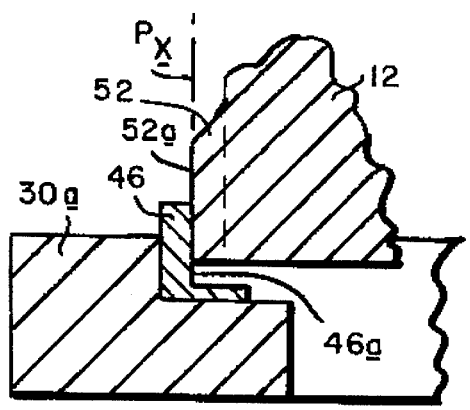
FIG. 4
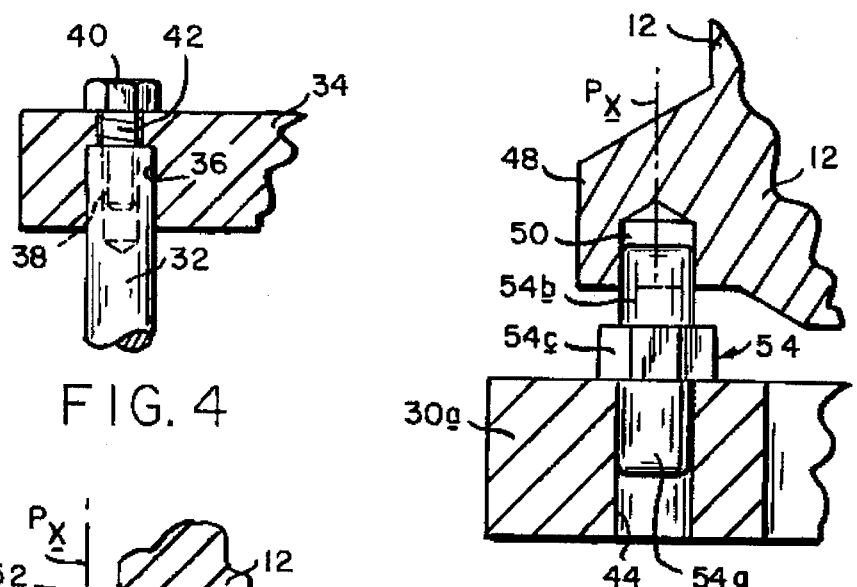
FIG. 5
FIG. 6

TURBINE SUPPORT STRUCTURE

BACKGROUND OF THE INVENTION

1. Field of the Invention

This invention relates generally to single-stage, mechanically driven steam turbines, and is concerned in particular with an improved support structure for reliably positioning and maintaining such turbines in accurate alignment with associated driven equipment such as pumps, blowers, fans, compressors and the like.

2. Description of the Prior Art

Single-stage, mechanically driven steam turbines have been in common use as prime movers in industry since the late 19th century. Early turbine designs were influenced by the designs of other contemporary machinery and mechanical devices. For example, early turbines often had supports that were formed as integral foot-like projections from the larger pressure containing vessels or casings. That is, they had integrally-cast legs, culminating in load-bearing, horizontal flat pads at the lower, outboard extremities of the main casing, much like the four "feet" of the then contemporary lathes and bath tubs. The feet were firmly bolted in place, and served effectively as simple yet rugged supports.

The steam used to drive the early turbines was most often generated at fairly low pressures and was usually saturated (unsuperheated), a condition which is considered relatively "cool" by today's standards. Turbine exhaust pressures and corresponding exhaust temperatures were also comparatively mild.

When a turbine is started from cold, stand-still conditions, the pressure casing soon warms to nearly the same temperature as the steam powering the turbine. As the casing warms, it undergoes thermal expansion in all directions. However, in the early turbine designs, thermal expansion was resisted by the support feet, which were bolted in place and thus restrained from freedom of movement. This resulted in the casings being subjected to significant stress and strain. This problem was compounded by the fact that as the casings expanded upwardly from the supporting foot pads, the turbine rotor shafts also underwent upward vertical displacement as well as axial expansion, resulting in alignment problems with respect to the equipment being driven by the turbines.

In the early years of low pressures and temperatures, these turbine thermal expansion dislocations, stresses and strains were largely inconsequential. But as years went by and boiler technology improved, steam pressures and temperatures increased progressively, as did turbine operating speeds. The thermal dislocations and the thermally-induced stresses and strains then became significant. Turbine shaft alignment to the driven equipment was kept within reason when in operation, by initially biasing the turbine below and away from the driven equipment when cold (called cold alignment), so that as turbine components expanded on warm-up, the turbine shaft would thermally move into satisfactory alignment. Later, so-called flexible couplings came into common use, providing less sensitivity to residual misalignment. The flexible couplings tended to minimize harmful vibration and related maladies caused by less-than-perfect rotating equipment alignment.

Eventually, pressures, temperatures and speeds reached a point at which thermal dislocations inherent in the foot-supported equipment became unacceptable for many users. This led to the development of a new type of turbine support which is still in use today, and which has come to be known as "centerline support". In centerline support arrangements, the support elements are separate from the turbine pressure casings to minimize temperature increases and thereby minimize thermal expansion. Further, they usually attach to the turbine at a location as close in elevation as possible to the location of the rotor shaft centerline, hence the terminology "centerline support". In fact, however, few have ever actually attached directly at the centerline.

The centerline support systems in current use in the industry all have numerous shortcomings, the most important being that they are not as rugged as the older integral foot support types. Most contemporary centerline support systems employ some sort of pedestal at the rotor shaft extension end of the turbine and a thin, flat plate-type column, called a "flex plate" or "flex leg", at the other end of the turbine. The pedestal is intended to be the primary means of fixing the turbine in place and of taking most of the external loads imposed by the piping carrying steam to and exhausting steam from the turbine. The flex plate is intended to carry the turbine deadweight at its respective end of the turbine, along with a portion of the vertical and lateral steam pipe loads. It is also intended to "flex" by elastic bending across its relatively thin section so that turbine longitudinal thermal expansion is only minimally resisted and thereby turbine stress and strain is minimized.

Contemporary pedestals are of generally two types. In one type, the pedestal is narrow-based and is attached to the sides or underside of the turbine shaft extension bearing housing. A primary disadvantage of this configuration is that the external piping loads are imposed on the bearing housing e.g. the load path from piping to foundation must pass through the bearing housing. This tends to distort the housing and cause bearing misalignment from one end of the turbine to the other. In the second type, the pedestal is wide-based and is attached to the turbine pressure casing near the centerline, outboard of the shaft extension bearing housing. The wide-base attachment results in increased stress and strain in both the turbine and pedestal from the "spreading" effect of the lateral thermal expansion of the hot turbine pressure casing. In the case of either pedestal type, they both are rather weak in resistance to torsion about the pedestal vertical axis, caused by steam piping loads. Such pedestals generally are comprised of ribbed and gussetted panels that occupy most of the end-face area of the turbine beneath and at either side of the shaft extension bearing housing. This expanse inconveniently obstructs access to the low-central shaft seal leakoffs and pressure casing and bearing housing drains. It also tends to inhibit free convective air flow around the bearing housing, which tends to promote heating of the bearing housing and its lubricants and also of the pedestal itself, thus significantly compromising the effectiveness of its ability to control centerline height, and to minimize thermal expansion.

The flex plate is invariably attached to the bearing housing at the turbine end opposite to the shaft extension. Thus, piping loads are again imposed on that bearing housing, exacerbating the bearing housing distortions and misalignments. The flex plate also tends to obstruct the low center of the inlet end of the turbine, again obstructing shaft seal leakoffs and casing drains and again tending in its flat, width expanse, to promote heating of the bearing housing and lubricant, and permitting undesirable turbine and turbine shaft thermal rise.

There remains, therefore, an unfulfilled need for an improved turbine support structure which offers all of the advantages of prior art structures without being saddled with the problems and disadvantages associated therewith.

Accordingly, a primary objective of the present invention is the provision of a turbine support structure which is extremely rugged, yet capable of providing both enhanced resistance to thermal centerline rise and minimal impedance to natural turbine casing thermal expansions in all directions.

Companion objectives include the provision of enhanced turbine shaft extension location control for optimum alignment to the driven equipment, isolation of bearing housings from external piping loads, minimum obstruction of turbine leakoff and drain connection zones, and minimum obstruction of convective cooling air currents about the turbine and its associated supports and bearing housings.

SUMMARY OF THE INVENTION

The support structure of the present invention includes a base which preferably takes the form of a rectangular, horizontal, open-center, frame. The base frame is adapted to be located, shimmed and bolted down to the user's mounting surface, thereby serving as the primary turbine substructure upon which all other support appurtenances are attached.

At the four corners of the base frame are four vertically protruding cantilever posts which are optimally proportioned to be very stiff in compression along their axes but rather weak and non-resistant to forces and deflections in any direction in the horizontal plane, as applied at their uppermost extended tips. The turbine pressure casing has four receiving sockets on its under-surface which receive and bear down upon the uppermost tips of the four posts. Thus, the four posts hold the turbine in suspended elevation on their tips, in close proximity to the turbine's horizontal casing joint and the rotational axis of the turbine output shaft. The posts offer minimum resistance to turbine casing thermal expansion in any horizontal direction, and thus minimize thermally induced stresses and strains that would otherwise build up if the casing were constrained by its support structure.

At a location precisely in-line and below the turbine shaft centerline, a vertical, double-ended trunnion pin pivotally interconnects the pressure casing to the base frame. The lower end of the trunnion pin projects downwardly in closely-fitted slidable engagement into a receiving socket in the base frame and the opposite, upper end of the trunnion pin projects upwardly, in closely-fitted slidable engagement into a receiving socket in a boss, integral with and located in the low center extremity of the turbine exhaust pressure casing. The trunnion pin effectively prevents translational motion of the turbine in relation to the base frame in any horizontal direction. The slidable fit of the trunnion pin in the receiving sockets of the base frame and the turbine exhaust casing, present minimal resistance to the thermal expansion differences between the hot turbine pressure casing and the relatively cool support posts projecting upwardly from the base frame. This slidable arrangement allows the hot turbine casing to expand downward, with negligible impedance from the point of its suspended location, virtually at the turbine horizontal centerline, at the top of the support posts where they bear within the receiving sockets in the casing underside.

On either side of the trunnion pin, the base frame has flat pad surfaces arranged to coact in face-to-face sliding engagement with similar flat pad surfaces on the turbine pressure casing. The face-to-face contact between the respective pad surfaces resists any tendency of the turbine pressure casing to rotate about the axis of the trunnion pin. Moreover, the slidable interface between the pad surfaces accommodates free expansion of the turbine casing in all directions in the vertical plane.

BRIEF DESCRIPTION OF THE DRAWINGS

FIG. 3 is a front elevational view of the turbine and its support structure; and FIG. 4, 5 and 6 are enlarged sectional views taken respectively on lines 4—4, 5—5 and 6—6 of FIG. 3.

DETAILED DESCRIPTION OF THE PREFERRED EMBODIMENT

Figure 1:
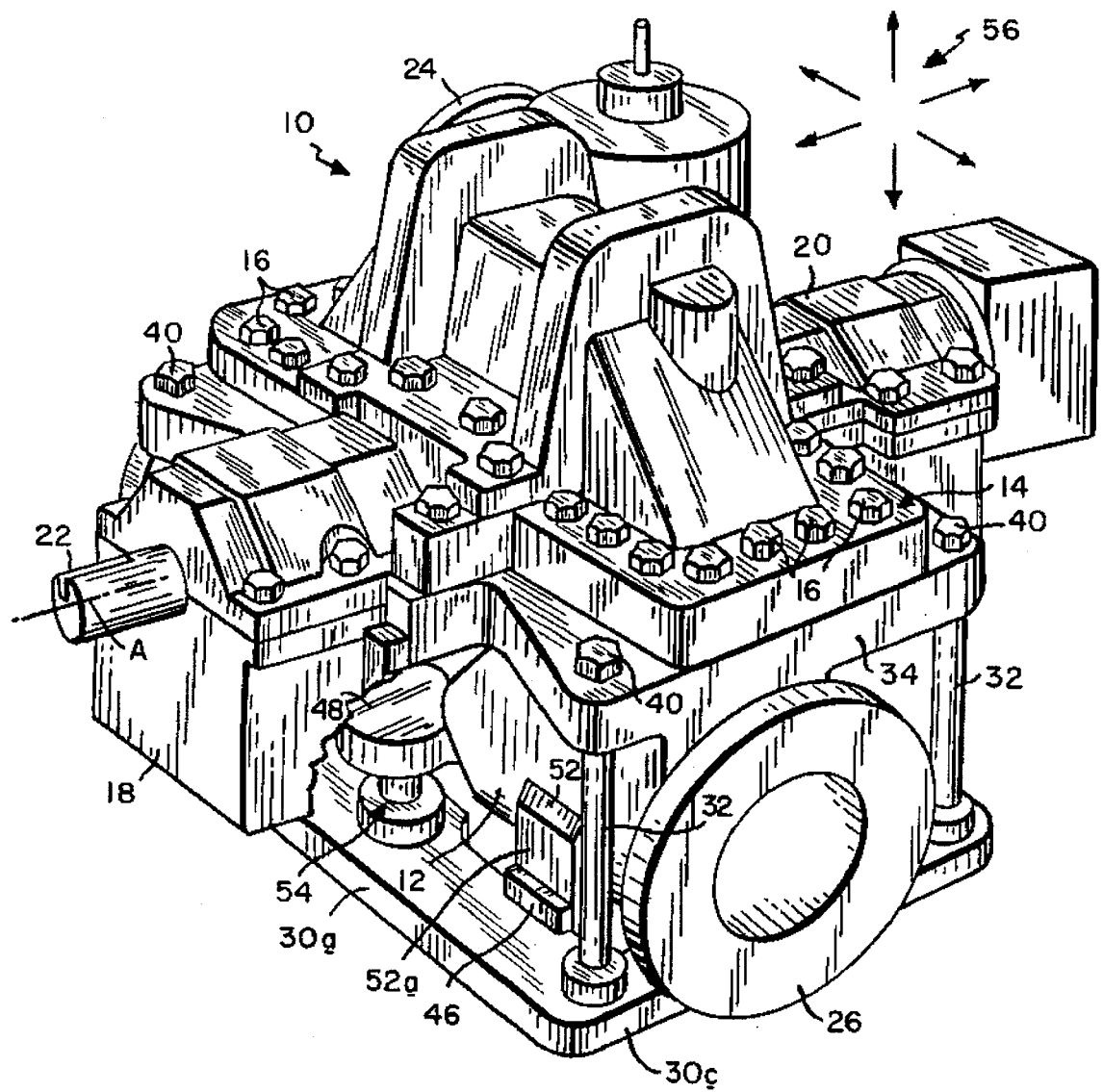
FIG. 1 is a perspective view of a mechanically driven steam turbine mounted on a support structure according to the present invention.

Referring initially to FIGS. 1 and 3, a mechanically driven steam turbine is generally depicted at 10. Turbine 10 includes a lower pressure casing 12; an upper pressure casing 14 separably joined by means of bolts 16 to the lower pressure casing at an interface lying a horizontal plane $P_H$; bearing housings 18, 20 containing bearings (not shown) supporting a turbine output shaft 22 for rotation about an axis A; and inlet and outlet fittings 24, 26 for connection to external steam supply and return piping. It will be understood that the rotational axis A of the output shaft 22 lies in the horizontal plane $P_H$.

Figure 2:
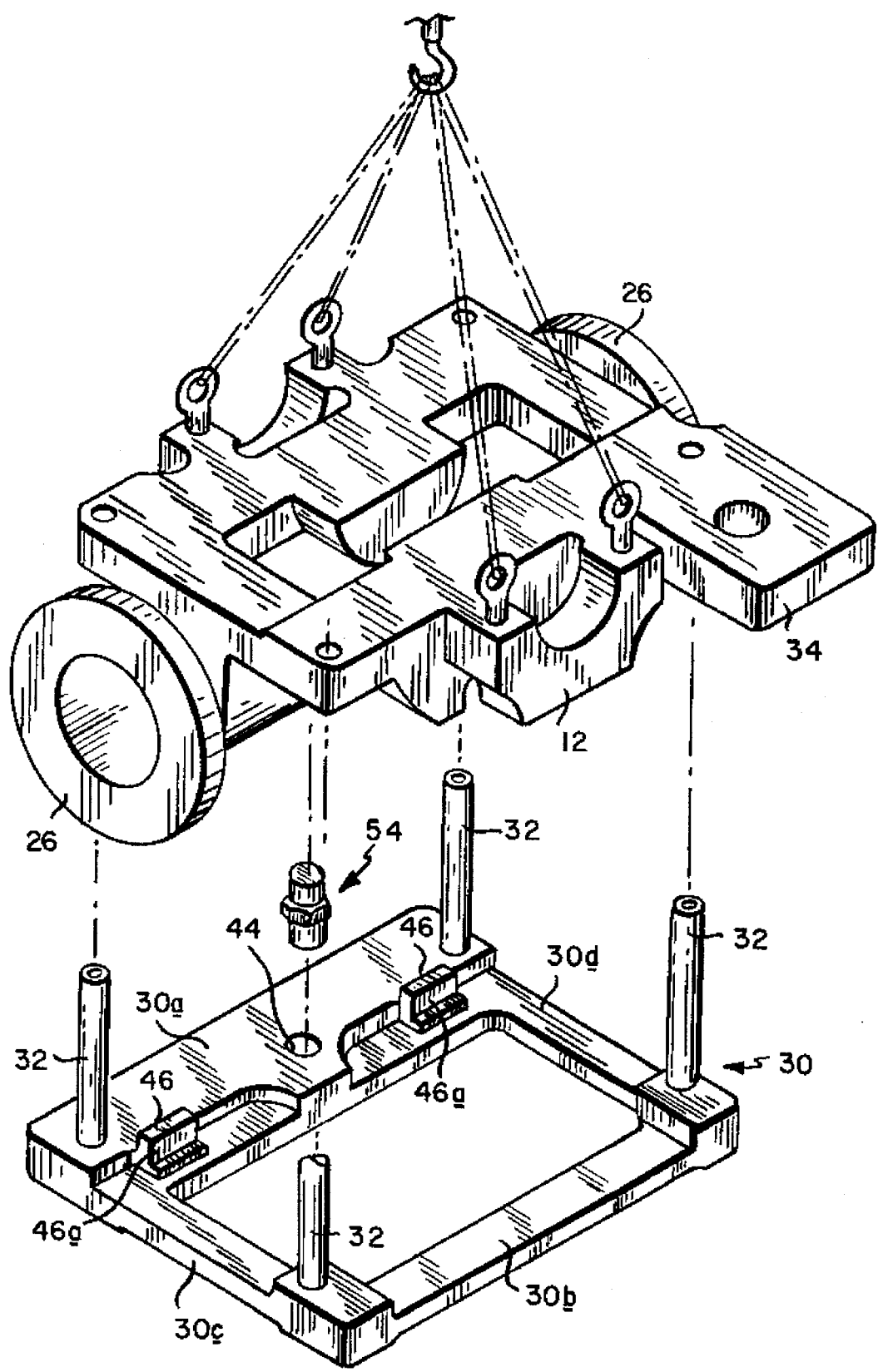
FIG. 2 an exploded perspective view of the principal components of the support structure.

Referring additionally to FIG. 2 it will be seen that the support structure for the turbine comprises the horizontal base frame 30 adapted to be shimmed and bolted down to a user's mounting surface (not shown). The base frame comprises a rectangular open-center structure having parallel front and rear segments 30a, 30b joined by parallel side segments 30c, 30d.

Four posts 32 protrude vertically in cantilever fashion from the corners of the base frame 30. The posts are stiff in compression in the direction of their axes, but are relatively weak and non-resistant to forces tending to deflect them in the horizontal plane, particularly at their upper most tips.

The lower pressure casing 12 has a peripheral flange 34 which, as can best be seen in FIG. 4, is provided with downwardly facing sockets 36 on its underside at locations aligned with the posts 32. As depicted in FIG. 2, during on-site assembly of the turbine, the lower pressure casing 12 is adapted to be lowered onto the posts 32 with the upper ends of the posts protruding upwardly into the sockets 36 to a level directly adjacent to the top surface of the peripheral casing flange 34, which lies in the horizontal plane $P_H$ containing the rotational axis A of the turbine output shaft 22. The lower pressure casing 12 is thus suspended on the upper ends of the posts 32 at a location overlying the base frame 30.

The upper ends of the posts 32 are tapped as at 38 to receive retaining bolts 40 extending downwardly through holes 42 which communicate with the sockets 36. When the lower pressure casing 12 is supported in this manner on the upper ends of the cantilever posts 32, the entire turbine 10 is free to undergo vertical thermal expansion and contraction in opposite directions with respect to the support plane defined by the upper ends of the posts 32. Because of their flexibility, the support posts also accommodate virtually unrestrained thermally induced horizontal expansion and contraction of the turbine.

The front segment 30a of the base frame 30 is additionally provided with a central bore 44 located precisely in line and below the axis A of the turbine output shaft 22. The bore 44 is located midway between a pair of pads 46 defining rearwardly facing flat contact surfaces 46a. The front portion of the lower pressure casing 12 is similarly provided with a central boss 48 defining a second bore 50. The boss 48 is located midway between integrally formed feet 52 defining forwardly facing flat contact surface 52a.

A trunnion pin 54 is interposed between the base frame 30 and the lower pressure casing 12. As can best be seen in FIG. 5, a lower end 54a of the trunnion pin is closely fitted in slidable engagement in the lower central bore 44, and an upper end 54b of the trunnion pin is likewise closely fitted in slidable engagement in the upper bore 50.

As can best be seen in FIG. 3, the axis of the trunnion pin 54 lies in a vertical plane $P_v$ which intersects the horizontal plane $P_H$ at the rotational axis A of the turbine output shaft 22. As shown in FIG. 5, the upper end 54b of the trunnion pin is spaced from the closed upper end of the bore 50, and the bottom of the lower pressure casing 12 is also spaced from the central collar 54c of the trunnion pin as well as from the front segment 30a of the base frame 30. The trunnion pin 54 thus serves to resist any tendency of the turbine to undergo horizontal translational movement, while at the same time accommodating vertical thermally induced expansion and contraction of the casing.

As shown in FIG. 6, the rearwardly facing contact surfaces 46a of the pads 46 on the front segment 30a of the base frame 30 are in sliding face-to-face contact with the forwardly facing contact surfaces 52a on the feet 52 of the lower pressure casing 12. The interfaces between contact surfaces 46a, 52a lie in a plane $P_x$ which also contain the axis of the trunnion pin 54. The contact surfaces 46a, 52a thus serve to resist any tendency of the turbine to pivot about the axis of the trunnion pin 54, while at the same time accommodating vertical thermally induced expansion and contraction of the casing.

In light of the foregoing, it will now be appreciated by those skilled in the art that the turbine shaft support structure of the present invention offers a number of significant advantages over conventional prior art support structures. To begin with, the suspension of the turbine on the upper ends of the four axially stiff yet laterally flexible posts 32 accommodates virtually unrestrained thermal expansion and contraction of the turbine casing and its associated components. Translational turbine movement is resisted by the trunnion pin connection of the casing to the base frame, and pivotal movement about the trunnion pin is resisted by the face-to-face engagement between the contact surfaces on the frame and casing on opposite sides of the trunnion pin.

The net result is that the turbine is reliably supported in a manner accommodating relatively unrestrained thermal expansion and contraction in at least the directions indicated diagrammatically by the arrows 56 in FIG. 1. The four support posts 32 are spaced one from the other as well as from the casing, thereby providing more freedom of access to the underside of the casing, while also accommodating improved air circulation around the casing, bearing housings, etc.

Piping loads applied to the inlet and outlet fittings 24, 26 are absorbed by the casing 12, the posts 32 and the base frame 30, with the bearing housings 18, 20 thus being isolated from resulting stresses.

I claim:

1. A support structure for a steam turbine having an output shaft driven for rotation about a horizontal axis, said support structure comprising:

a base;

a plurality of posts protruding upwardly in cantilever fashion from said base on opposite sides of a vertical plane containing said horizontal axis, said turbine being vertically supported exclusively by said posts at a location overlying said base;

first means for connecting said turbine to said base for pivotal movement about a vertical axis; and second means for opposing pivotal movement of said turbine about said vertical axis.

2. The support structure of claim 1 wherein said base is generally rectangular with an open center.

3. The support structure of claim 2 wherein said base is adapted to be fixed horizontally beneath said turbine.

4. The support structure of claim 1 wherein said support posts are axially rigid to thereby vertically suspend said turbine above said base, and said posts are resiliently bendable to accommodate thermal expansion and contraction of said turbine.

5. The support structure of claim 4 wherein said turbine has a pressure casing subdivided into upper and lower sections separably joined at an interface lying in a horizontal plane containing the horizontal rotational axis of said output shaft, and, said posts have upper ends received in sockets in said lower casing section, the upper ends of said posts being located adjacent to said horizontal plane.

6. The support structure of claim 2 wherein said frame includes side members extending on opposite sides of and parallel to said vertical plane, with front and rear members extending in directions perpendicular to,said vertical plane to join said side members at the corners of said frame.

7. The support structure of claim 6 wherein said posts protrude vertically from respective corners of said frame.

8. The support structure of claim 1 wherein said vertical axis is contained in said vertical plane.

9. The support structure of either claims 1 or 8 wherein said first means comprises mutually aligned sockets in said turbine and said base, and a trunnion pin having opposite ends received in and slidable vertically with respect to said sockets.

10. The support structure of claim 1 wherein said second means comprises mutually engageable contact surfaces on said base and said turbine arranged respectively on opposite sides of said vertical plane.

11. The support structure of claim. 10 wherein the interface between said mutually engageable contact surfaces lies in a plane perpendicular to said vertical plane.

12. For use in combination with a steam turbine having an output shaft driven for rotation about an axis lying in a vertical plane, a structure for supporting said turbine, said support structure comprising:

a base frame underlying said turbine;

a plurality of posts arranged on opposite sides of said vertical plane and protruding vertically in cantilever fashion from said base frame to contact and provide the sole vertical support for said turbine, said support posts being resiliently bendable to accommodate thermally induced expansion and contraction of said turbine; and means for resisting bodily movement of said turbine with respect to said base frame while accommodating resilient bending of said posts.

* * * * *